US008486160B2

(12) United States Patent
Hwang et al.

(10) Patent No.: US 8,486,160 B2
(45) Date of Patent: Jul. 16, 2013

(54) RECHARGEABLE BATTERY

(75) Inventors: Po-Jung Hwang, Yongin-si (KR);
Seung-Jae Lee, Yongin-si (KR);
Yoo-Myung Kang, Yongin-si (KR);
Jae-Do Ahn, Yongin-si (KR); Jae-Min Yang, Yongin-si (KR); Jeong-Heon Lee, Yongin-si (KR); Byeong-Yeol Song, Yongin-si (KR); Jae-Hyun Hwang, Yongin-si (KR); Sung-Soo Kim, Yongin-si (KR); Sae-Weon Roh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 292 days.

(21) Appl. No.: 12/960,415

(22) Filed: Dec. 3, 2010

(65) Prior Publication Data
US 2011/0151307 A1    Jun. 23, 2011

Related U.S. Application Data

(60) Provisional application No. 61/287,663, filed on Dec. 17, 2009.

(51) Int. Cl.
*H01M 2/14* (2006.01)
*H01M 2/02* (2006.01)
*H01M 10/02* (2006.01)
*H01M 10/04* (2006.01)

(52) U.S. Cl.
USPC ........... 29/623.4; 429/129; 429/133; 429/139

(58) Field of Classification Search
USPC ...... 29/623.5, 623.4; 429/129, 133, 136–139, 429/142
See application file for complete search history.

(56) References Cited

U.S. PATENT DOCUMENTS

| 2007/0117008 | A1* | 5/2007 | Kaneko et al. | 429/152 |
| 2007/0154790 | A1* | 7/2007 | Jeung et al. | 429/139 |
| 2011/0287301 | A1* | 11/2011 | Kim et al. | 429/160 |

FOREIGN PATENT DOCUMENTS

| JP | 06-036801 A | 2/1994 |
| JP | 07-272761 A | 10/1995 |
| JP | 07272761 A * | 10/1995 |
| JP | 10-064506 A | 3/1998 |
| JP | 2002-208442 A | 7/2002 |
| JP | 2003-017112 | 1/2003 |
| JP | 2003-017112 A | 1/2003 |
| JP | 2004-014528 A | 1/2004 |
| JP | 2004014528 A * | 1/2004 |
| JP | 2007311323 | 11/2007 |
| JP | 2008-091100 A | 4/2008 |

OTHER PUBLICATIONS

European Search Report dated Apr. 15, 2011 in corresponding Application No. 102521515.
Office Action dated Feb. 28, 2013 for corresponding CN Application No. 2010105935553.

* cited by examiner

*Primary Examiner* — Gregg Cantelmo
(74) *Attorney, Agent, or Firm* — Knobbe, Martens, Olson & Bear, LLP

(57) ABSTRACT

A rechargeable battery comprises: an electrode assembly comprising a plurality of positive electrode plates, a plurality of negative electrode plates, and a plurality of separators; and a case enclosing the electrode assembly; wherein each separator in the plurality of separators comprises a central portion facing at least one of the positive and negative electrode plates, and an extended portion that extends past the positive and negative electrode plates, and wherein each of the extended portion comprises an adhered portion that is adhered to adjacent extended portions.

19 Claims, 11 Drawing Sheets

RECHARGEABLE BATTERY

CROSS-REFERENCE TO RELATED APPLICATIONS

This application claims priority to and the benefit of U.S. Provisional Application No. 61/287,663, filed on Dec. 17, 2009, the entire content of which is incorporated herein by reference.

BACKGROUND

1. Field

The present invention relates to a rechargeable battery, and more particularly, to a separator finishing structure of a laminate type of electrode assembly.

2. Description of the Related Technology

A rechargeable battery differs from a primary battery in that it can be repeatedly charged and discharged, while the latter can only irreversibly convert chemical energy to electrical energy. A low-capacity rechargeable battery is typically used as a power supply for small electronic devices, such as cellular phones, notebook computers, and camcorders, while a high-capacity rechargeable battery is typically used as a power supply for driving motors in hybrid vehicles and the like.

A rechargeable battery generally includes an electrode assembly with a positive electrode plate, a separator, and a negative electrode plate, and a case receiving the electrode assembly. The case is formed with a cylindrical or prismatic metal can, or with a laminate sheet having a resin sheet layer and a metal sheet layer. The electrode assembly may be formed as a spiral-wound type or a laminate type depending upon the shape of the case.

With the laminate type of electrode assembly in which several sheets of positive electrode plates, separators, and negative electrode plates are laminated, the edges of the separators protruded to the outside of the positive and negative electrode plates are typically tightly adhered to each other, and wrapped by an adhesive tape, thereby holding the shape of the electrode assembly.

However, if the rechargeable battery with a finishing structure based on the adhesive tape is used for a long period of time, the adhesion of the separators can weaken due to deterioration of the adhesive tape. As a result, the electrode assembly does not hold the initial bonding and the alignment thereof may be broken so that the bonding between the positive and negative electrode plates is weakened and the performance characteristics of the rechargeable battery are significantly deteriorated.

SUMMARY

Embodiments of the present invention have been made in an effort to provide a rechargeable battery having advantages of allowing the electrode assembly to hold an initial fixation characteristic even after long-time usage to achieve high battery durability and long life span characteristics.

An embodiment of the present invention provides a rechargeable battery comprising: an electrode assembly comprising a plurality of positive electrode plates, a plurality of negative electrode plates, and a plurality of separators; and an case enclosing the electrode assembly; wherein each separator in the plurality of separators comprises a central portion facing at least one of the positive and negative electrode plates and an extended portion that extends past the positive and negative electrode plates, and wherein each of the extended portions comprises an adhered portion that is adhered to adjacent extended portions.

The extended portions of the separators may further comprise bent portions that are not adhered and that extend from the central portions toward the adhered portions.

The electrode assembly may have a cross section, and the bent portions are bent from the central portions towards a center of the cross section, and the adhered portions are positioned at the center of the cross section.

The bent portions may be bent from the central portions towards a plane of a top surface or a bottom surface of the electrode assembly, and the adhered portions are positioned over the plane.

The adhered portions may be further bent.

The adhered portions may be further bent in a direction substantially perpendicular to a top surface or a bottom surface of the electrode assembly.

The electrode assembly may comprise a plurality of stacks of positive electrode plates, negative electrode plates and separators, and wherein the stacks are adhered together by outermost separators on each stack.

The stacks may be adhered together at the adhered portions of the outermost separators.

The electrode assembly may comprise a first stack and a second stack, wherein the bent portions of the first stack are bent from the central portions toward a plane of a top surface of the first stack, wherein the bent portions of the second stack are bent from the central portions toward a plane of a bottom surface of the second stack, and wherein the first and second stacks are adhered together such that the adhered portions are positioned at a center of a cross section of the electrode assembly.

Each electrode plate having the same polarity may be interposed between pairs of separators, and each electrode plate of opposite polarity may be interposed between adjacent pairs of separators. The separators in each pair of separators may be adhered to each other along preliminary adhered portions in the extended portions, and adjacent pairs of separators may be adhered to each other to form the adhered portions.

The adhered portions of the separators may be smaller than the preliminary adhered portions in length in a direction from the central portions toward an edge of the extended portions.

The rechargeable battery may further comprise electrode terminals coupled with the electrode assembly on opposite sides of the electrode assembly, wherein the adhered portions of the separators extend from opposite sides of the electrode assembly adjacent to the sides from which the electrode terminals extend.

The rechargeable battery may further comprise electrode terminals coupled with the electrode assembly on opposite sides of the electrode assembly, wherein the adhered portions of the separators extend from all sides of the electrode assembly except for in the areas from which the electrode terminals extend.

The adhered portions may extend throughout entire lengths of opposite sides of the electrode assembly.

The extended portions may extend throughout entire lengths of opposite sides of the electrode assembly, and the adhered portions extend throughout only a part of the lengths of each opposite side of the electrode assembly.

The adhered portions may be positioned at a center of each opposite side of the electrode assembly.

The adhered portions may be positioned at ends of each opposite side of the electrode assembly.

The adhered portions may alternate with extended portions that are not adhered throughout the lengths of each opposite side of the electrode assembly.

Another embodiment of the present invention provides a method of forming a rechargeable battery comprising: providing an electrode assembly comprising a plurality of positive electrode plates, a plurality of negative electrode plates, and a plurality of separators; and enclosing the electrode assembly with an case; wherein each separator in the plurality of separators comprises a central portion facing at least one of the positive and negative electrode plates and an extended portion that extends past the positive and negative electrode plates, and wherein each of the extended portions comprises an adhered portion that is adhered to adjacent extended portions.

The adhered portions may be formed by a heat treatment or an ultrasonic process.

According to an embodiment, the extended portions are welded to each other so as to form adhered portions, thereby simplifying the finishing process of the separators and rigidly bonding the electrode assembly. Accordingly, for the rechargeable battery, the bonding between the positive and the negative electrode plates may be held even after long-time usage so that the alignment thereof can be prevented from being broken and high structural stability and rigidity can be achieved.

DETAILED DESCRIPTION

Certain embodiments will now be described more fully hereinafter with reference to the accompanying drawings.

Embodiments of the present invention will be described more fully hereinafter with reference to the accompanying drawings. As those skilled in the art would realize, the described embodiments may be modified in various different ways, all without departing from the spirit or scope of the present invention.

Figure 1:
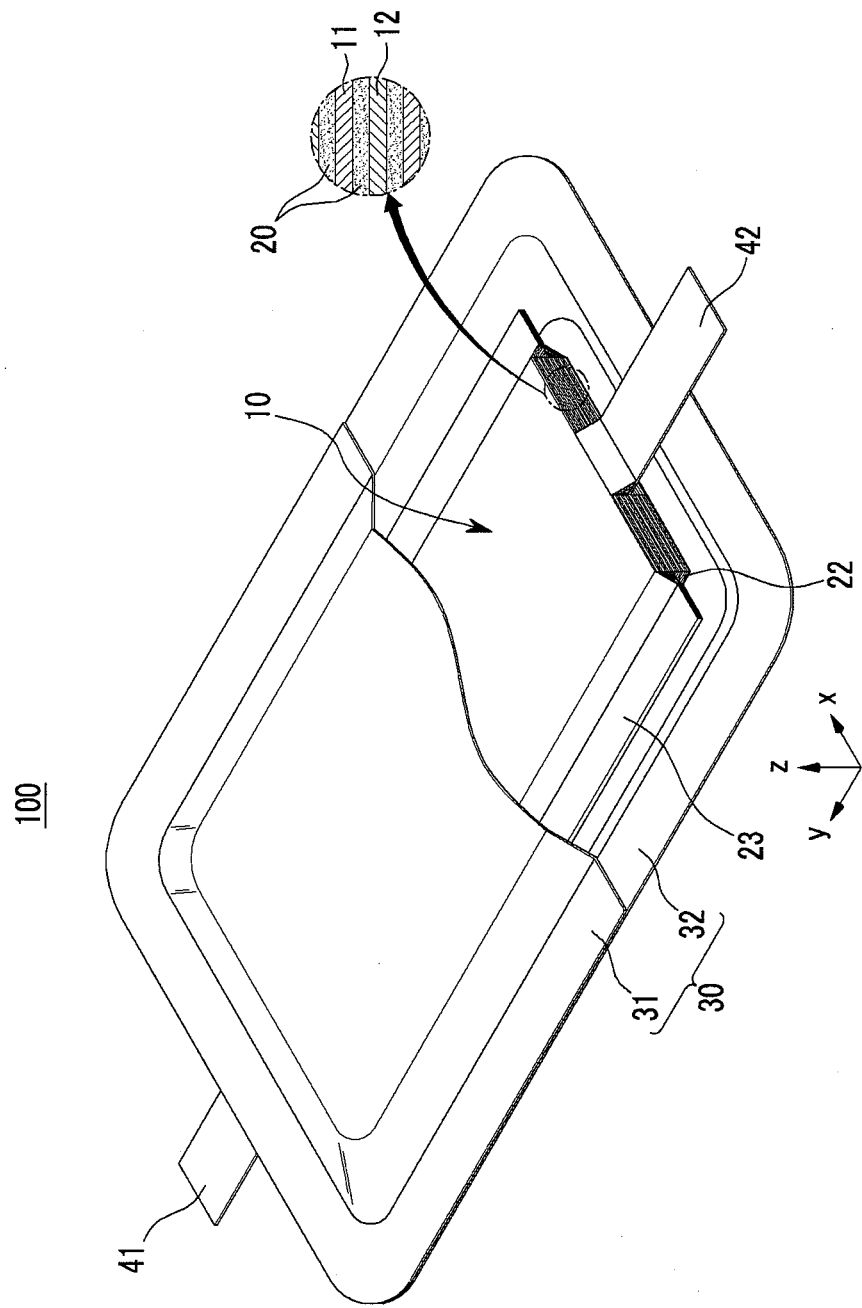
FIG. 1 is a partial cut-away perspective view of a rechargeable battery according to an embodiment of the present invention.
Figure 2:
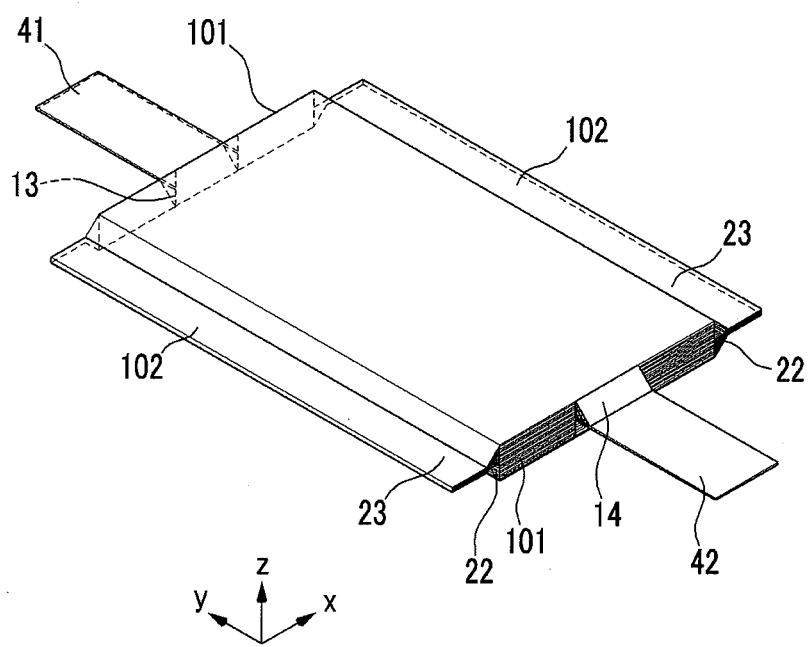
FIG. 2 is a perspective view of an electrode assembly and electrode terminals in the rechargeable battery shown in FIG. 1.

FIG. 1 is a partial cut-away perspective view of a rechargeable battery according to a first embodiment of the present invention, and FIG. 2 is a perspective view of an electrode assembly and electrode terminals in the rechargeable battery shown in FIG. 1.

Referring to FIG. 1 and FIG. 2, the rechargeable battery 100 according to the illustrated embodiment includes an electrode assembly 10 with positive electrode plates 11, separators 20, and negative electrode plates 12, a case 30 receiving the electrode assembly 10, and electrode terminals 41 and 42 connected to the electrode assembly 10 and drawn out of the case 30.

The separator 20, the positive electrode plate 11, the separator 20, the negative electrode plate 12, and the separator 20 may be sequentially and repeatedly laminated so as to form the electrode assembly 10. In this sequence, the positive electrode plate 11 may be replaced by the negative electrode plate 12 and the negative electrode plate 12 by the positive electrode plate 11. One sheet of the separators 20 may be disposed between the positive and negative electrode plates 11 and 12 such that two sheets of the separators 20 do not overlap each other.

The electrode terminals 41 and 42 may include a positive electrode terminal 41 connected to the positive electrode plates 11, and a negative electrode terminal 42 connected to the negative electrode plates 12. The positive and negative electrode plates 11 and 12 may include current collecting regions 13 and 14, respectively, which are protruded to the outside of the separators 20 and tightly adhered to each other through pressurizing them. The positive and negative electrode terminals 41 and 42 may be connected to the current collecting region 13 of the positive electrode plates 11 and the current collecting region 14 of the negative electrode plates 12, respectively.

The positive and negative electrode terminals 41 and 42 may be drawn out to one side of the case 30 or to both sides thereof. FIG. 1 and FIG. 2 illustrate the case in which the current collecting region 13 of the positive electrode plates 11 and the current collecting region 14 of the negative electrode plates 12 are formed opposite to each other, and the positive and negative electrode terminals 41 and 42 are drawn out to both sides of the case 30.

The case 30 may include an upper case 31 with a concave center, and a lower case 32. The upper and lower cases 31 and 32 may be formed with laminate sheets. The upper and lower cases 31 and 32 can receive an electrolyte-impregnated electrode assembly 10 therein, and may be adhered, e.g., thermally welded, to each other at the edges thereof so as to seal the electrode assembly 10. The shape and material of the case 30 are not limited to as above-described, but may be altered in various manners.

The electrode assembly 10 may be roughly formed in the shape of a rectangular solid. The electrode assembly 10 can include a pair of first sides 101 facing each other in a first direction (in the y axis direction), and a pair of second sides 102 facing each other in a second direction (in the x axis direction). The current collecting regions 13 and 14 and the electrode terminals 41 and 42 may be placed on at least one of the pair of first sides 101. The first sides 101 may be the short sides of the electrode assembly 10, and the second sides 102 may be the long sides thereof.

Figure 3:
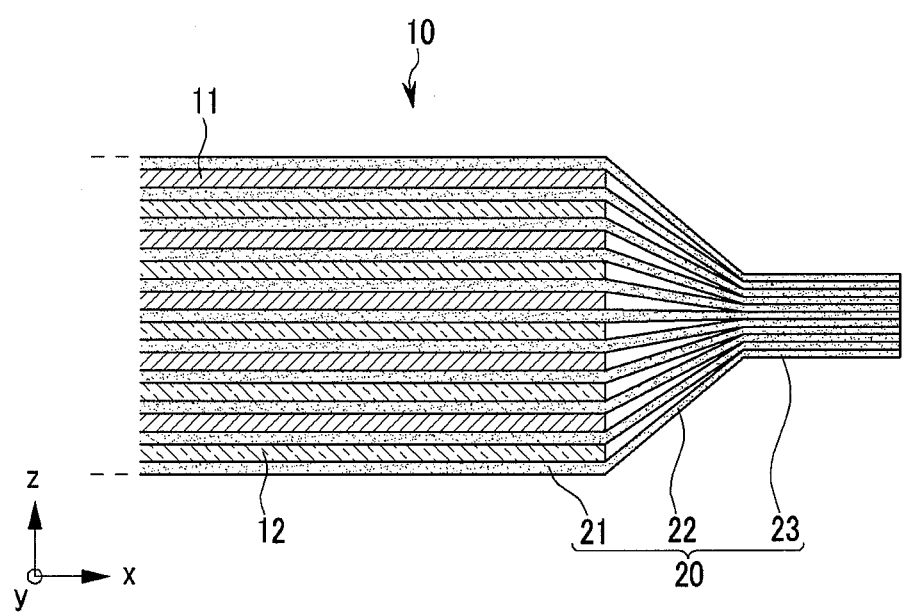
FIG. 3 is a partial amplified sectional view of the electrode assembly shown in FIG. 2.

FIG. 3 is a partial amplified sectional view of the electrode assembly shown in FIG. 2.

Referring to FIG. 1 to FIG. 3, the separators 20 can each include a center 21 facing at least one of the positive and negative electrode plates 11 and 12 and overlapped therewith, and a pair of extensions, including bent portions 22 and adhered portions 23, extended from the center 21 to the outside of the positive and negative electrode plates 11 and 12. The pair of extensions, including portions 22 and 23, may be placed at the second sides 102 where the current collecting regions 13 and 14 and the electrode terminals 41 and 42 are absent.

The extensions may be overlapped with each other at the second sides 102, and may be tightly adhered to each other at the edges thereof in a body so as to form adhered portions 23. The adhered portions 23 may be formed by melting and pressing the surfaces of the separators 20 together, for example, through thermal welding or ultrasonic welding, such that the positive and negative electrode plates 11 and 12 are stably fixed between the centers 21 of the separators 20.

The adhered portions 23 are connected to the bent portions 22 of all the separators 20 provided in the electrode assembly 10 so as to bind them into one. That is, a single adhered portion 23 may exist in the thickness direction of the electrode assembly 10 (in the z axis direction). Consequently, the finishing process of the separators 20 can be simplified, and the bonding of the electrode assembly 10 may become reinforced overall. The adhered portions 23 can have excellent adhesive strength and air tightness, and hence the extensions may not be separated from each other even after long-time usage so that the durability of the rechargeable battery 100 may be effectively improved.

The extensions may be symmetrically gathered in the thickness direction of the electrode assembly 10 (in the z axis direction) so that the adhered portion 23 can be formed at the center of the electrode assembly 10 in the thickness direction of the electrode assembly 10 (in the z axis direction). In this case, the adhered portion 23 may be formed while uniformly pressurizing the extensions so that the shape stability of the electrode assembly 10 can be enhanced.

The adhered portions 23 may be provided at the second sides 102 with a longer length than that of the first sides 101. Accordingly, the bonded area can become enlarged along the edge of the electrode assembly 10, and the fixation of the electrode assembly 10 can be enhanced. Particularly, as the adhered portions 23 have the same length as the second sides 102, the fixation of the electrode assembly 10 can be maximized.

In this way, with the rechargeable battery 100 according to the first embodiment, the electrode assembly 10 can rigidly bond the extensions of the separators 20 over the entire area of the pair of second sides 102 by way of the adhered portions 23. Consequently, even after long-time usage of the rechargeable battery 100, the bonding of the positive and negative electrode plates 11 and 12 may be maintained therebetween so that the alignment thereof is prevented from being broken, thereby securing high structural stability and rigidity.

Figure 4:
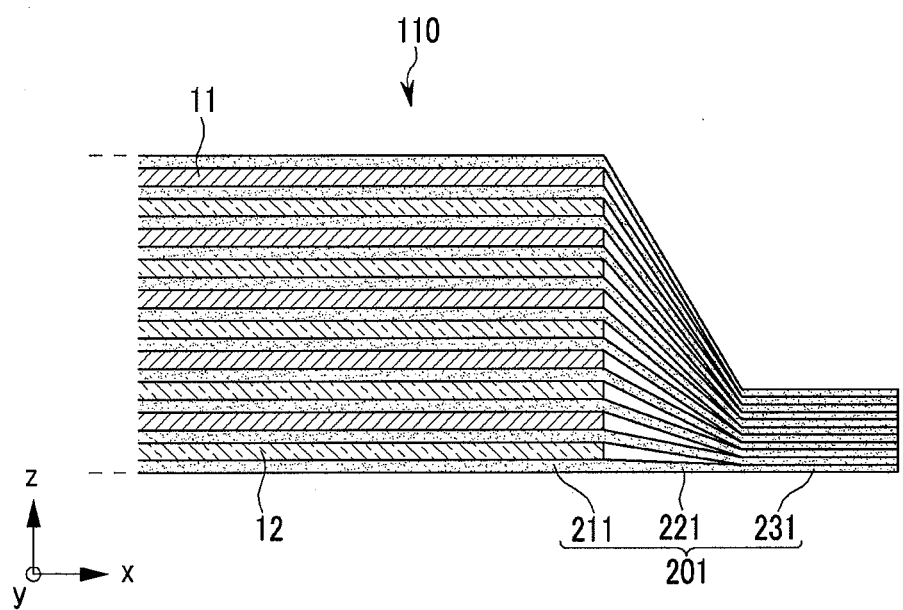
FIG. 4 is a partial amplified sectional view of an electrode assembly in a rechargeable battery according to another embodiment of the present invention.

FIG. 4 is a partial amplified sectional view of an electrode assembly in a rechargeable battery according to a second embodiment of the present invention.

Referring to FIG. 4, the rechargeable battery according to the second illustrated embodiment has the same structural components as those of the rechargeable battery according to the first illustrated embodiment, except that extensions, including bent portions 221 and adhered portions 231, are asymmetrically gathered in the thickness direction of the electrode assembly 110 (in the z axis direction), and an adhered portion 231 is biased to one side of the electrode assembly 110 in the thickness direction of the electrode assembly 110 (in the z axis direction).

Reference numeral 201 of FIG. 4 refers to the separator, and reference numeral 211 refers to the center of the separator. The same reference numerals as with the rechargeable battery according to the first illustrated embodiment are used to refer to the structural components other than the separator.

The extensions according to the second illustrated embodiment may be gathered toward the outermost extension, and the adhered portion 231 may be located at the extended top or bottom side of the electrode assembly 110. It is illustrated in FIG. 4 that the adhered portion 231 is located at the extended bottom side of the electrode assembly 110.

The extensions may be disposed between a pair of heating plates (not shown) provided at a welder, and pressurized and welded by way of the heating plates so as to form adhered portions 231. In this process, for the first illustrated embodiment, the pair of heating plates can simultaneously move so as to form the adhered portions 23, whereas for the second illustrated embodiment, only one heating plate can move while the other heating plate is fixed so as to form the adhered portions 231. Therefore, the case according to the second embodiment is more suitable for mass production.

Figure 5:
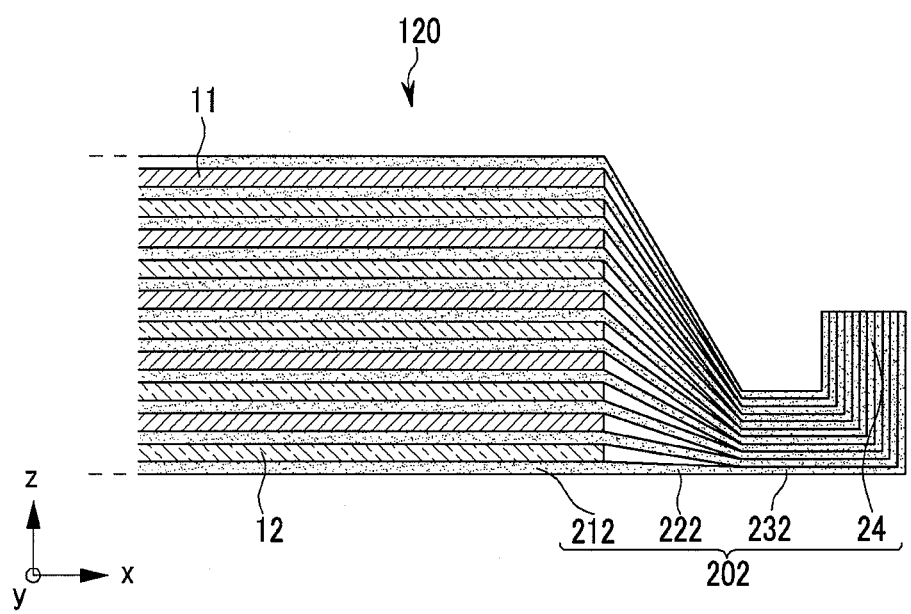
FIG. 5 is a partial amplified sectional view of an electrode assembly in a rechargeable battery according to another embodiment of the present invention.

FIG. 5 is a partial amplified sectional view of an electrode assembly in a rechargeable battery according to a third embodiment of the present invention.

Referring to FIG. 5, the rechargeable battery according to the third illustrated embodiment may have the same structural components as those of the rechargeable battery according to the second illustrated embodiment, except that an adhered portion 232 may be biased to one side of the electrode assembly 120 in the thickness direction of the electrode assembly 120 (in the z axis direction), i.e., to the lower side of FIG. 5, while being bent to the other side of the electrode assembly 120, i.e., to the upper side of FIG. 5, so as to form a folded portion 24 at the end thereof.

Reference numeral 202 of FIG. 5 refers to the separator, reference numeral 212 refers to the center of the separator, and reference numeral 222 refers to the bended portions of the extension of the separator. The same reference numerals as with the rechargeable battery according to the second illustrated embodiment are used to refer to the structural components other than the separator.

As the width of the adhered portion 232 is increased, the bonding area of the extensions is enlarged so that the bonding between the separators 202 is reinforced. However, because the adhered portion 232 of the electrode assembly 120 participates in battery reaction, when the width of the adhered portion 232 is increased in comparison with the same-dimensioned case 30, the electrode area can be reduced.

In this connection, for the structure where the adhered portion 232 is bent so as to form a bent portion 24 parallel to the thickness direction of the electrode assembly 10 (in the z axis direction), the area of the positive and negative electrode plates 11 and 12 can be widened in comparison with the same-dimensioned case 30 while enlarging the width of the adhered portion 232 to reinforce the bonding between the separators 202, thereby enhancing battery efficiency.

Figure 6:
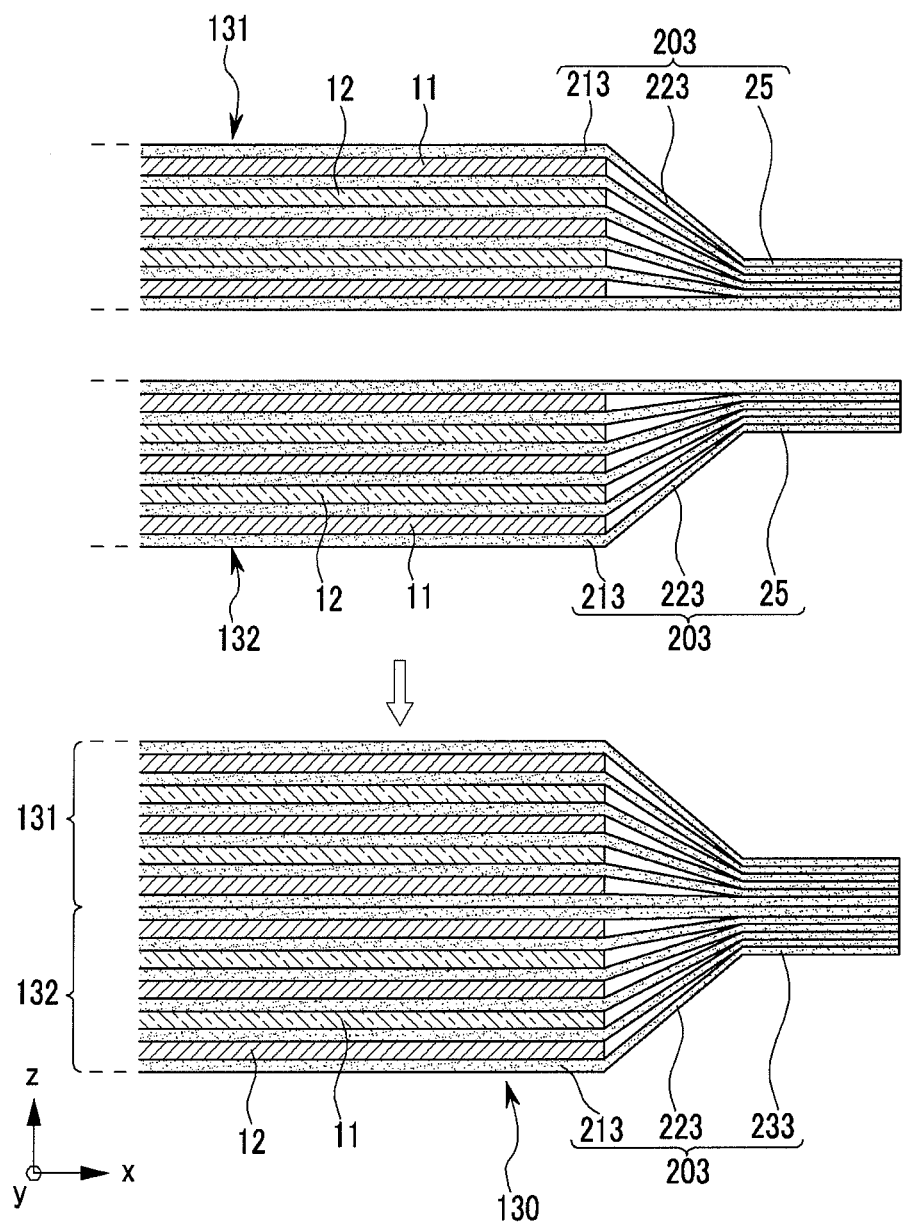
FIG. 6 is a partial amplified sectional view of an electrode assembly in a rechargeable battery according to another embodiment of the present invention.

FIG. 6 is a partial amplified sectional view of an electrode assembly in a rechargeable battery according to a fourth embodiment of the present invention.

Referring to FIG. 6, the rechargeable battery has the same structural components as those of the rechargeable battery according to the first illustrated embodiment of the present invention, except that the electrode assembly 130 has a laminate structure with a first electrode assembly part 131 having at least one positive electrode plate 11, at least one negative electrode plate 12, and a preliminary adhered portion 25, and a second electrode assembly part 132 having at least one positive electrode plate 11, at least one negative electrode plate 12, and a preliminary adhered portion 25. The preliminary adhered portion 25 of the first electrode assembly part 131 and the preliminary adhered portion 25 of the second electrode assembly part 132 are again adhered so as to form a adhered portion 233.

It is illustrated in FIG. 6 that the electrode assembly 130 includes two electrode assembly parts 131 and 132, but the rechargeable battery according to the fourth illustrated embodiment may include three electrode assembly parts or more, each with a preliminary adhered portion 25, and the preliminary adhered portions 25 of the electrode assembly parts may be again adhered so as to form a adhered portion 233.

Reference numeral 203 of FIG. 6 refers to the separator, reference numeral 213 refers to the center of the separator, and reference numeral 223 refers to bent portions of the extension of the separator. The same reference numerals as with the rechargeable battery according to the first illustrated embodiment are used to refer to the structural components other than the separator 203.

The edges of the separators 203 may be adhered to each other with respect to the respective first and second electrode assembly parts 131 and 132 to form preliminary adhered portions 25. The first and second electrode assembly parts 131 and 132 may be laminated, and the two preliminary adhered portions 25 may be adhered to each other so as to form the adhered portion 233. In this case, two separators 203 exist at the contact area of the first and second electrode assembly parts 131 and 132. That is, the outermost separator of one of the electrode assembly parts may be overlapped with the outermost separator of the other electrode assembly part.

In this way, when the electrode assembly 130 is divided into two parts or more and preliminary adhered portions 25 are formed, the electrode assembly 130 may be effectively prevented from being distorted or defective during the welding process, thereby enhancing the quality of the electrode assembly 130. FIG. 6 illustrates that the first and second electrode assembly parts 131 and 132 are provided with six sheets of separators 203, but the number of separators 203 contained in the respective electrode assembly parts is not limited to as illustrated.

Figure 7:
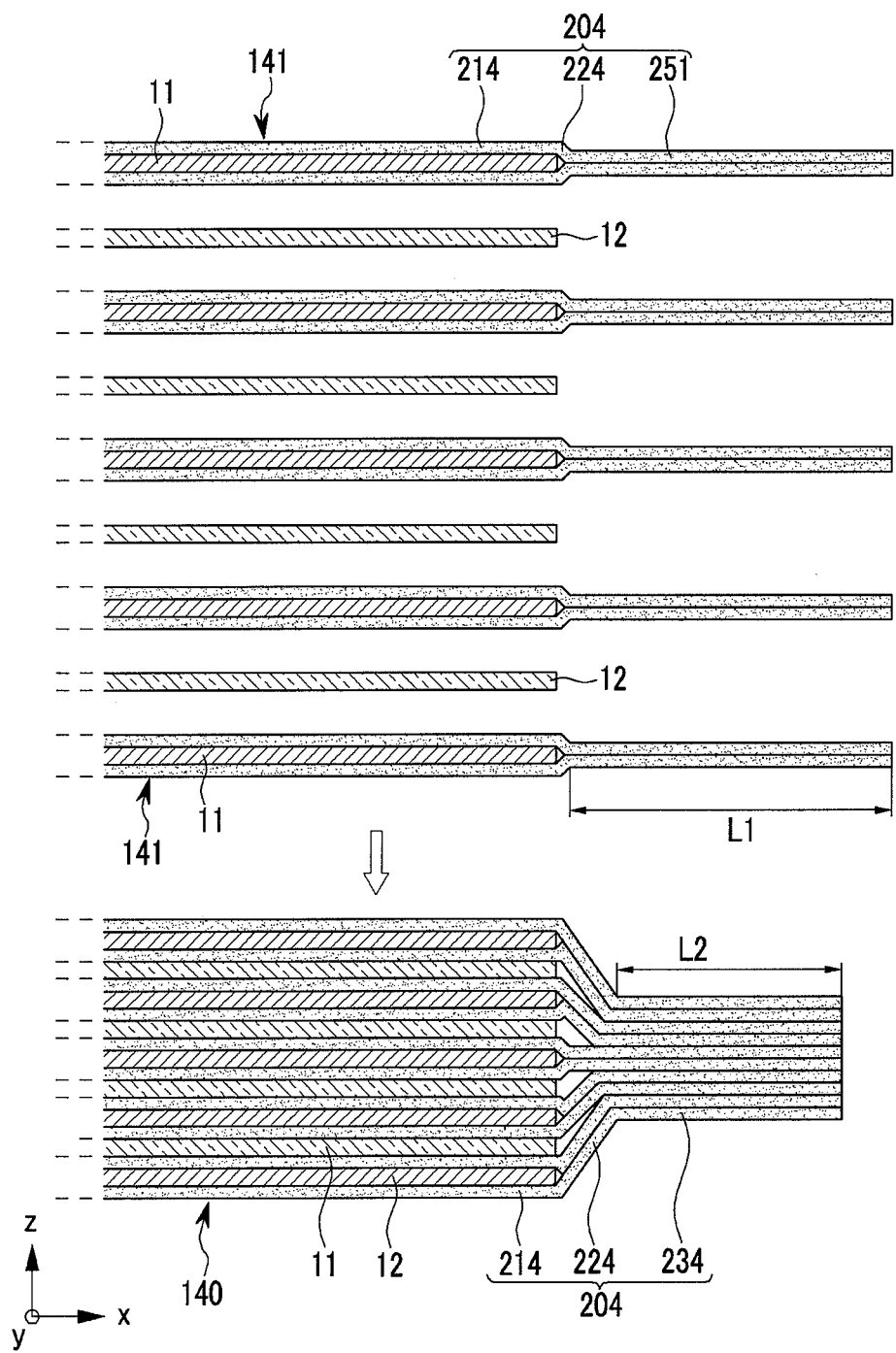
FIG. 7 is a partial amplified sectional view of an electrode assembly in a rechargeable battery according to another embodiment of the present invention.

FIG. 7 is a partial amplified sectional view of an electrode assembly in a rechargeable battery according to a fifth embodiment of the present invention.

Referring to FIG. 7, the rechargeable battery according to the fifth illustrated embodiment has the same structural components as those of the rechargeable battery according to the first illustrated embodiment, except that the electrode assembly 140 has a laminate structure with a plurality of constructions each having one positive electrode plate 11 or negative electrode plate 12, two sheets of separators 204, and a preliminary adhered portion 251, and a plurality of negative electrode plates 12 or positive electrode plates 11 disposed between the constructions while being tightly adhered thereto. The preliminary adhered portions 251 laminated by the number of constructions 141 may again be welded to each other so as to form a adhered portion 234.

Reference numeral 214 of FIG. 7 refers to the center of the separator, and reference numeral 224 the extension of the separator. The same reference numerals as for the rechargeable battery according to the first illustrated embodiment are used to refer to the structural components other than the separator 204.

A positive electrode plate 11 or negative electrode plate 12 may be disposed between two sheets of separators 204, and the edges of the two separator extensions 224 may be adhered to each other so as to form the preliminary adhered portion 251. In this way, a plurality of constructions 141 may be formed and sequentially laminated together with a plurality of negative electrode plates 12 or positive electrode plates 11. The laminated preliminary adhered portions 251 may be again adhered to each other so as to form the adhered portion 234. In this case, the length L1 of the preliminary adhered portion 251 measured at each construction 141 may be larger than the length L2 of the adhered portion 234 measured at the electrode assembly 140 as a whole.

As described above, when the electrode assembly 140 is formed with a plurality of constructions 141, the electrode assembly 140 is prevented from being distorted or defective during the welding process, thereby enhancing the quality of the electrode assembly, as with the fourth illustrated embodiment.

Figure 8:
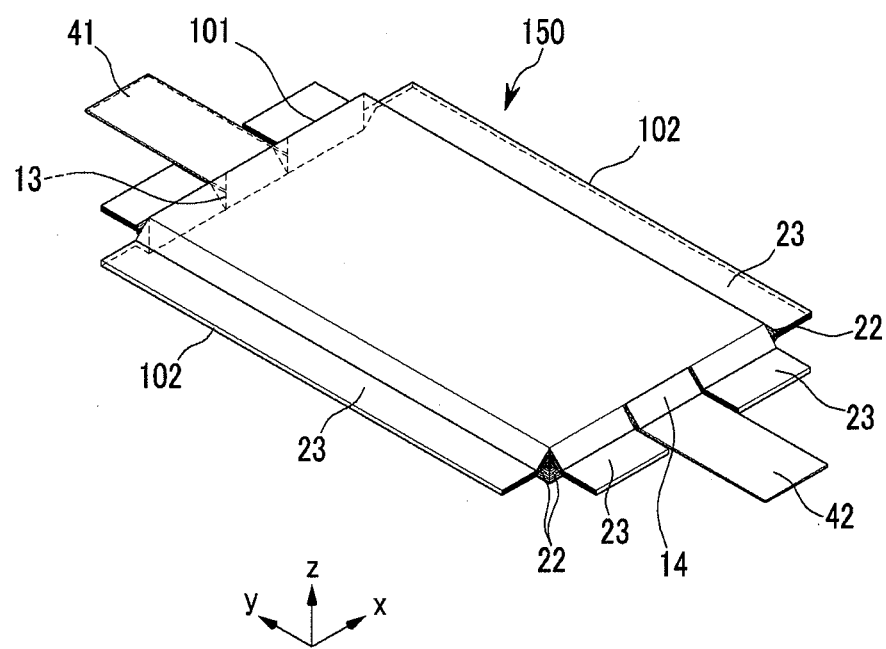
FIG. 8 is a perspective view of an electrode assembly in a rechargeable battery according to another embodiment of the present invention.

FIG. 8 is a perspective view of an electrode assembly in a rechargeable battery according to a sixth embodiment of the present invention.

Referring to FIG. 8, the rechargeable battery according to the sixth illustrated embodiment has the same structural components as those of the rechargeable battery according to any one of the first to fifth illustrated embodiments of the present invention, except that extensions 22 may be formed at the first sides 101 of the electrode assembly 150 except for the current collecting regions 13 and 14 as well as at the second sides 102 of the electrode assembly 150, and an adhered portion 23 may be formed at the edge of each extension 22. FIG. 8 illustrates the case in which the features according to the sixth illustrated embodiment are combined with the structure according to the first illustrated embodiment.

With the sixth illustrated embodiment, the adhered portions 23 are formed over the entire area of the first sides 101 except for the current collecting regions 13 and 14, and the second sides 102. Accordingly, compared with the first to fifth illustrated embodiments, the bonded area along the edge of the electrode assembly 150 may be enlarged so as to achieve excellent structural stability and rigidity.

Figure 9:
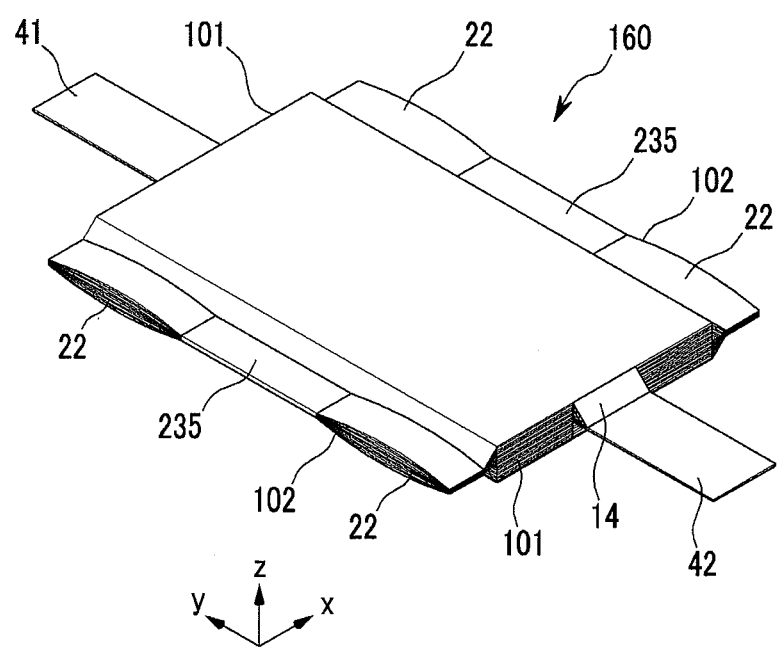
FIG. 9 is a perspective view of an electrode assembly in a rechargeable battery according to another embodiment of the present invention.

FIG. 9 is a perspective view of an electrode assembly in a rechargeable battery according to a seventh illustrated embodiment of the present invention.

Referring to FIG. 9, the rechargeable battery according to the seventh illustrated embodiment has the same structural components as those of the rechargeable battery according to any one of the first to fifth illustrated embodiments, except that the adhered portion 235 has a shorter length than that of the second side 102 and is located at the center of the second side 102. FIG. 9 illustrates the case in which the features according to the seventh illustrated embodiment are combined with the structure according to the first illustrated embodiment.

Figure 10:
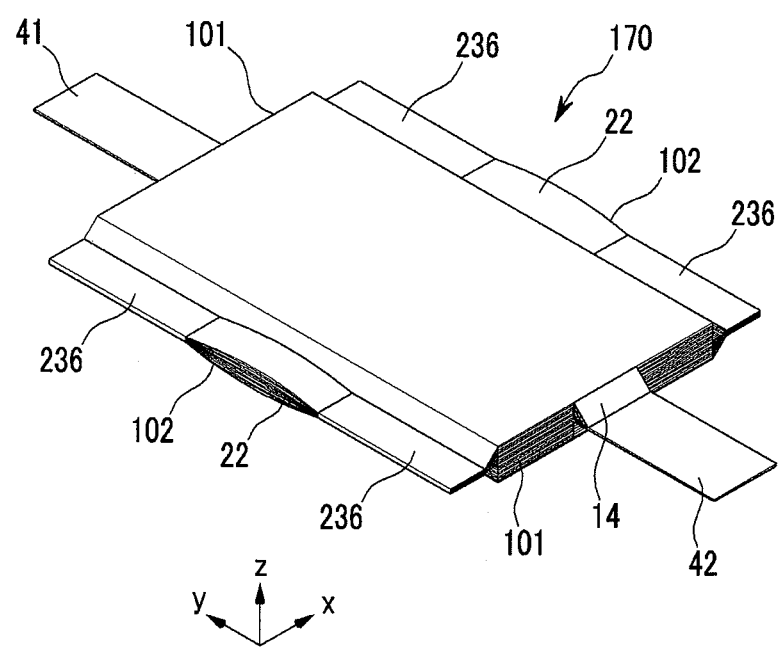
FIG. 10 is a perspective view of an electrode assembly in a rechargeable battery according to another embodiment of the present invention.

FIG. 10 is a perspective view of an electrode assembly in a rechargeable battery according to an eighth embodiment of the present invention.

Referring to FIG. 10, the rechargeable battery according to the eighth illustrated embodiment has the same structural components as those of the rechargeable battery according to any one of the first to fifth illustrated embodiments, except that two adhered portions 236 are formed at the respective second sides 102 while being spaced apart from each other by a distance. FIG. 10 illustrates the case in which the features according to the eighth illustrated embodiment are combined with the structure according to the first illustrated embodiment.

With the electrode assemblies 160 and 170 according to the seventh and eighth illustrated embodiments, the extensions 22 are laminated through pressurizing at the second sides 102 except for the adhered portions 235 and 236, but are not adhered so that a predetermined gap is formed between the laminated extensions 22.

When the rechargeable batteries according to the seventh and eighth illustrated embodiments are compared with the rechargeable batteries according to the first to sixth illustrated embodiments, the adhered portions 235 and 236 have a shorter length than that of the second sides 102 so that the electrode assemblies 160 and 170 have lowered rigidity, but they have enhanced electrolyte impregnation characteristic as the electrode assemblies 160 and 170 are easily impregnated with the electrolyte through the gap between the extensions 22.

Figure 11:
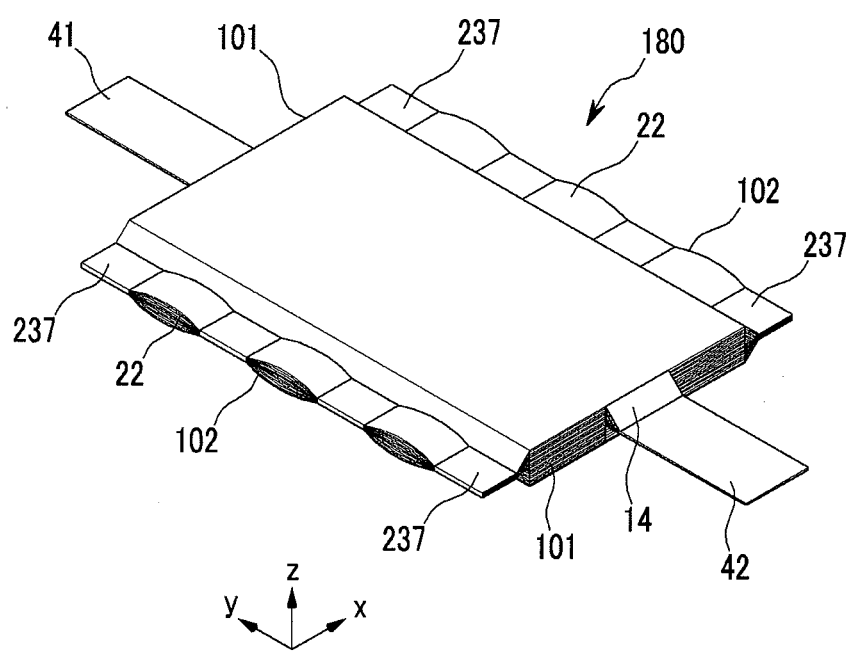
FIG. 11 is a perspective view of an electrode assembly in a rechargeable battery according to another embodiment of the present invention.

FIG. 11 is a perspective view of an electrode assembly in a rechargeable battery according to a ninth illustrated embodiment of the present invention.

Referring to FIG. 11, the rechargeable battery according to the ninth illustrated embodiment has the same structural components as those of the rechargeable battery according to any one of the first to fifth illustrated embodiments, except that three or more adhered portions 237 are formed at the respective second sides 102 while being spaced apart from each other by a distance. FIG. 11 illustrates the case in which the features according to the ninth illustrated embodiment are combined with the structure according to the first illustrated embodiment.

With the electrode assembly 180 according to the ninth illustrated embodiment, the extensions 22 are laminated through pressurizing at the second sides 102 except for the adhered portions, but are not adhered so that a predetermined gap is formed between the laminated extensions 22.

Three or more adhered portions 237 are formed at the second side 102 while being spaced apart from each other by a distance so that uniform fixation occurs in the longitudinal direction of the second side 102, and the electrode assembly 180 is uniformly impregnated with the electrolyte through the gap between the laminated extensions 22. Accordingly, the rechargeable battery according to the ninth illustrated embodiment properly has excellent rigidity that is the advantage of the rechargeable batteries according to the first to sixth illustrated embodiments, and an excellent electrolyte impregnation characteristic that is the advantage of the rechargeable batteries according to the seventh and eighth illustrated embodiments.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
    an electrode assembly comprising a plurality of positive electrode plates, a plurality of negative electrode plates, and a plurality of separators; and
    a case enclosing the electrode assembly;
    wherein each separator in the plurality of separators comprises a central portion facing at least one of the positive and negative electrode plates and an extended portion that extends past the positive and negative electrode plates, and wherein each of the extended portions comprises an adhered portion that is adhered to adjacent extended portions; and
    wherein each electrode plate having the same polarity is interposed between pairs of separators, each electrode plate of opposite polarity is interposed between adjacent pairs of separators, the separators in each pair of separators are adhered to each other along preliminary adhered portions in the extended portions, and adjacent pairs of separators are adhered to each other to form the adhered portions.

2. The rechargeable battery of claim 1, wherein the extended portions of the separators further comprise bent portions that are not adhered and that extend from the central portions toward the adhered portions.

3. The rechargeable battery of claim 2, wherein the electrode assembly has a cross section with a center, the bent portions are bent from the central portions towards a center of the cross section, and the adhered portions are positioned at the center of the cross section.

4. The rechargeable battery of claim 2, wherein the bent portions are bent from the central portions towards a plane of a top surface or a bottom surface of the electrode assembly, and the adhered portions are positioned over the plane.

5. The rechargeable battery of claim 1, wherein the adhered portions are further bent.

6. The rechargeable battery of claim 5, wherein the adhered portions are further bent in a direction substantially perpendicular to a top surface or a bottom surface of the electrode assembly.

7. The rechargeable battery of claim 1, wherein the electrode assembly comprises a plurality of stacks of positive electrode plates, negative electrode plates and separators, and wherein the stacks are adhered together by outermost separators on each stack.

8. The rechargeable battery of claim 7, wherein the stacks are adhered together at the adhered portions of the outermost separators.

9. The rechargeable battery of claim 7, wherein the electrode assembly comprises a first stack and a second stack, wherein the bent portions of the first stack are bent from the central portions toward a plane of a top surface of the first stack, wherein the bent portions of the second stack are bent from the central portions toward a plane of a bottom surface of the second stack, and wherein the first and second stacks are adhered together such that the adhered portions are positioned at a center of a cross section of the electrode assembly.

10. The rechargeable battery of claim 1, wherein the adhered portions of the separators are smaller than the preliminary adhered portions in length in a direction from the central portions toward an edge of the extended portions.

11. The rechargeable battery of claim 1, further comprising electrode terminals coupled with the electrode assembly on opposite sides of the electrode assembly, wherein the adhered portions of the separators extend from opposite sides of the electrode assembly adjacent to the sides from which the electrode terminals extend.

12. The rechargeable battery of claim 1, further comprising electrode terminals coupled with the electrode assembly on opposite sides of the electrode assembly, wherein the adhered portions of the separators extend from all sides of the electrode assembly except for in the areas from which the electrode terminals extend.

13. The rechargeable battery of claim 1, wherein the adhered portions extend throughout entire lengths of opposite sides of the electrode assembly.

14. The rechargeable battery of claim 1, wherein the extended portions extend throughout entire lengths of opposite sides of the electrode assembly, and the adhered portions extend throughout only a part of the lengths of each opposite side of the electrode assembly.

15. The rechargeable battery of claim 14, wherein the adhered portions are positioned at a center of each opposite side of the electrode assembly.

16. The rechargeable battery of claim 14, wherein the adhered portions are positioned at ends of each opposite side of the electrode assembly.

17. The rechargeable battery of claim 14, wherein the adhered portions alternate with extended portions that are not adhered throughout the lengths of each opposite side of the electrode assembly.

18. A method of forming a rechargeable battery comprising:

providing an electrode assembly comprising a plurality of positive electrode plates, a plurality of negative electrode plates, and a plurality of separators; and enclosing the electrode assembly with a case;

wherein each separator in the plurality of separators comprises a central portion facing at least one of the positive and negative electrode plates and an extended portion that extends past the positive and negative electrode plates, and wherein each of the extended portions comprises an adhered portion that is adhered to adjacent extended portions and wherein each electrode plate having the same polarity is interposed between pairs of separators, each electrode plate of opposite polarity is interposed between adjacent pairs of separators, the separators in each pair of separators are adhered to each other along preliminary adhered portions in the extended portions, and adjacent pairs of separators are adhered to each other to form the adhered portions.

19. The method of claim 18, wherein the adhered portions are formed by a heat treatment or an ultrasonic process.

* * * * *